(12) United States Patent
Jerez

(10) Patent No.: US 11,388,856 B2
(45) Date of Patent: Jul. 19, 2022

(54) RAMPED CONNECTOR AND BLADE FOR USE WITH ROTARY HEAD ASSEMBLY

(71) Applicant: Orlando Jerez, Kenner, LA (US)

(72) Inventor: Orlando Jerez, Kenner, LA (US)

( * ) Notice: Subject to any disclaimer, the term of this patent is extended or adjusted under 35 U.S.C. 154(b) by 0 days.

(21) Appl. No.: 14/617,398

(22) Filed: Feb. 9, 2015

(65) Prior Publication Data

US 2015/0201557 A1 Jul. 23, 2015

Related U.S. Application Data

(63) Continuation-in-part of application No. PCT/US2013/053801, filed on Aug. 6, 2013.

(60) Provisional application No. 61/681,304, filed on Aug. 9, 2012, provisional application No. 62/041,945, filed on Aug. 26, 2014.

(51) Int. Cl.
*A01D 34/416* (2006.01)

(52) U.S. Cl.
CPC ........ *A01D 34/416* (2013.01); *A01D 34/4166* (2013.01)

(58) Field of Classification Search
CPC .................... A01D 34/416; A01D 34/4166
USPC ........................................... 30/276, 347
See application file for complete search history.

(56) References Cited

U.S. PATENT DOCUMENTS

| | | | |
|---|---|---|---|
| 4,065,913 A | 1/1978 | Fisher et al. | |
| 4,126,990 A * | 11/1978 | Fisher | A01D 34/4166 56/12.7 |
| 4,126,991 A * | 11/1978 | Gobin | A01D 34/4168 56/12.7 |
| 4,190,954 A | 3/1980 | Walto | |
| 5,048,278 A * | 9/1991 | Jones | A01D 34/4166 30/276 |
| 5,398,516 A | 3/1995 | Mackey | |
| 5,433,006 A | 7/1995 | Taguchi | |
| 5,836,227 A | 11/1998 | Dees, Jr. et al. | |
| 5,901,448 A | 5/1999 | Lingerfelt | |
| 5,979,064 A | 11/1999 | Kitz et al. | |
| 6,108,914 A * | 8/2000 | Sheldon | A01D 34/4166 30/276 |
| 6,928,741 B2 | 8/2005 | Proulx et al. | |
| 7,000,324 B2 | 2/2006 | Fogle | |
| 7,257,898 B2 * | 8/2007 | Iacona | A01D 34/416 30/276 |
| D597,084 S | 8/2009 | Alliss | |
| 7,913,401 B2 | 3/2011 | Iacona | |
| 8,863,395 B2 * | 10/2014 | Alliss | A01D 34/4166 30/276 |

(Continued)

FOREIGN PATENT DOCUMENTS

| | | |
|---|---|---|
| EP | 1421840 A1 | 5/2004 |
| EP | 1614337 A1 | 1/2006 |

(Continued)

*Primary Examiner* — Hwei-Siu C Payer
(74) *Attorney, Agent, or Firm* — Norton IP Law Firm LLC; Taylor M. Norton

(57) ABSTRACT

A rotary head assembly apparatus, and a cutting blade for use on trimmer rotary head assemblies are disclosed. The rotary head assembly apparatus is configured to easily replace cutting members necessary to cut unwanted plants. The cutting blade is for use on trimmer rotary head assemblies configured to cut unwanted vegetation.

17 Claims, 15 Drawing Sheets

(56) References Cited

U.S. PATENT DOCUMENTS

| | | | |
|---|---|---|---|
| 8,973,274 B2* | 3/2015 | Proulx | A01D 34/4166 30/122 |
| 9,603,301 B2* | 3/2017 | Jerez | A01D 34/416 |
| 10,070,582 B2* | 9/2018 | Nolin | A01D 34/4166 |
| 10,070,583 B2* | 9/2018 | Jerez | A01D 34/4166 |
| 2009/0038163 A1 | 2/2009 | Jerez et al. | |
| 2010/0083506 A1 | 4/2010 | Bennett | |
| 2014/0033546 A1* | 2/2014 | Arnetoli | A01D 34/4166 30/347 |
| 2015/0201557 A1* | 7/2015 | Jerez | A01D 34/4166 30/276 |
| 2015/0216122 A1* | 8/2015 | Jerez | A01D 34/4165 30/276 |
| 2015/0342117 A1* | 12/2015 | Alliss | A01D 34/4166 30/276 |

FOREIGN PATENT DOCUMENTS

| | | | |
|---|---|---|---|
| EP | 1586231 A1 | | 2/2008 |
| FR | 2358818 A1 | | 2/1978 |
| GB | 2299923 A | | 10/1996 |
| WO | WO 2014/025789 A1 * | | 2/2014 |

* cited by examiner

SECTION B-B

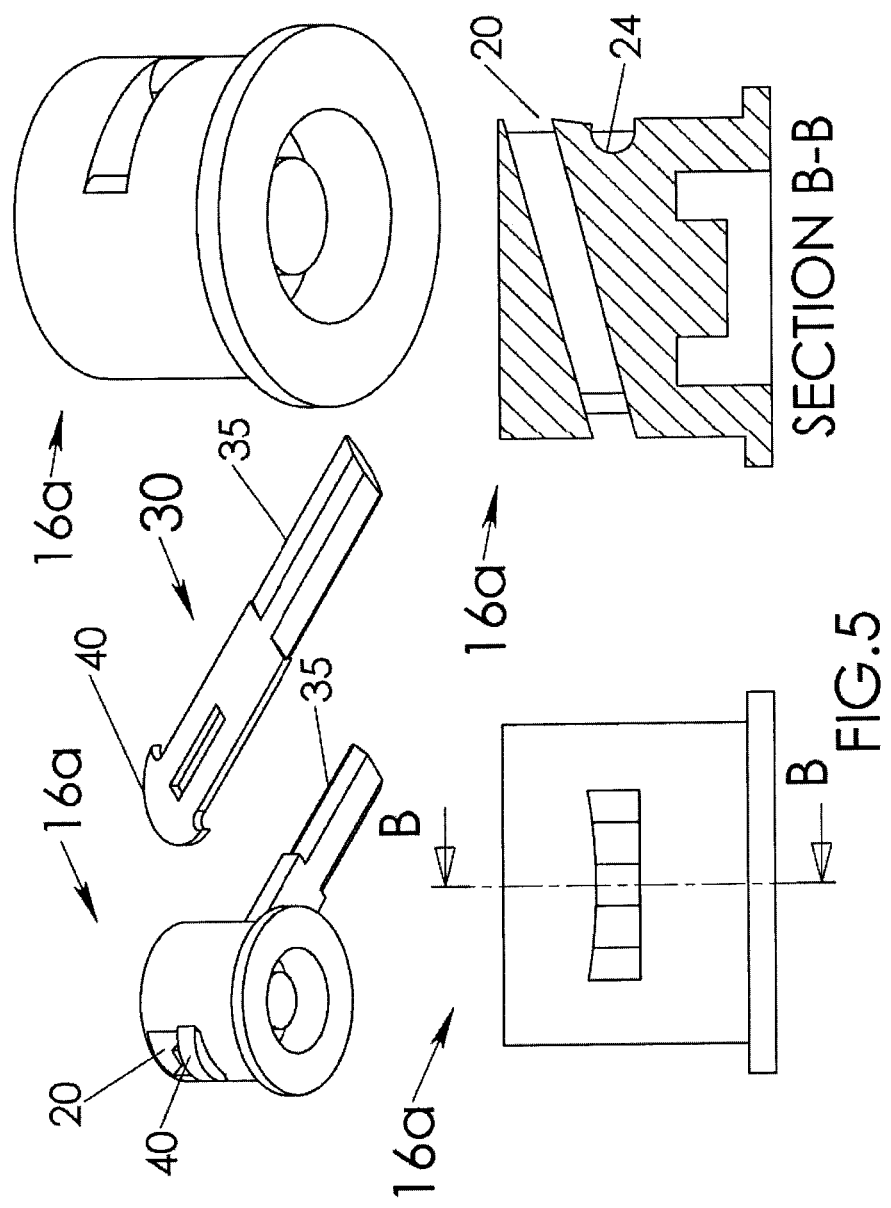

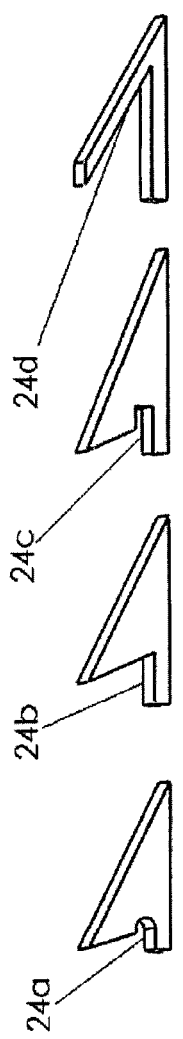

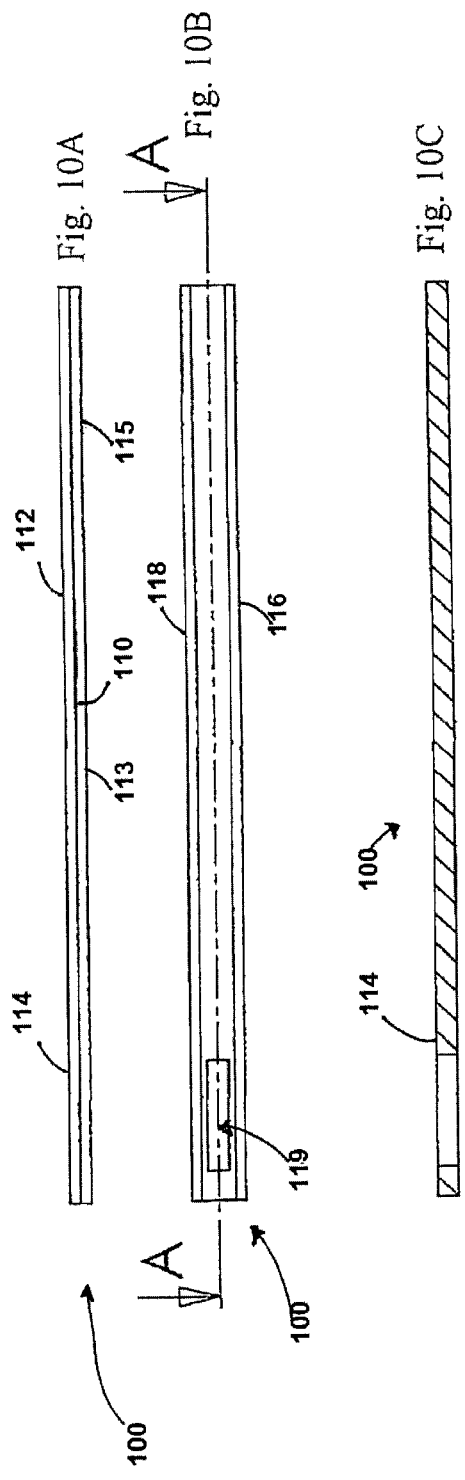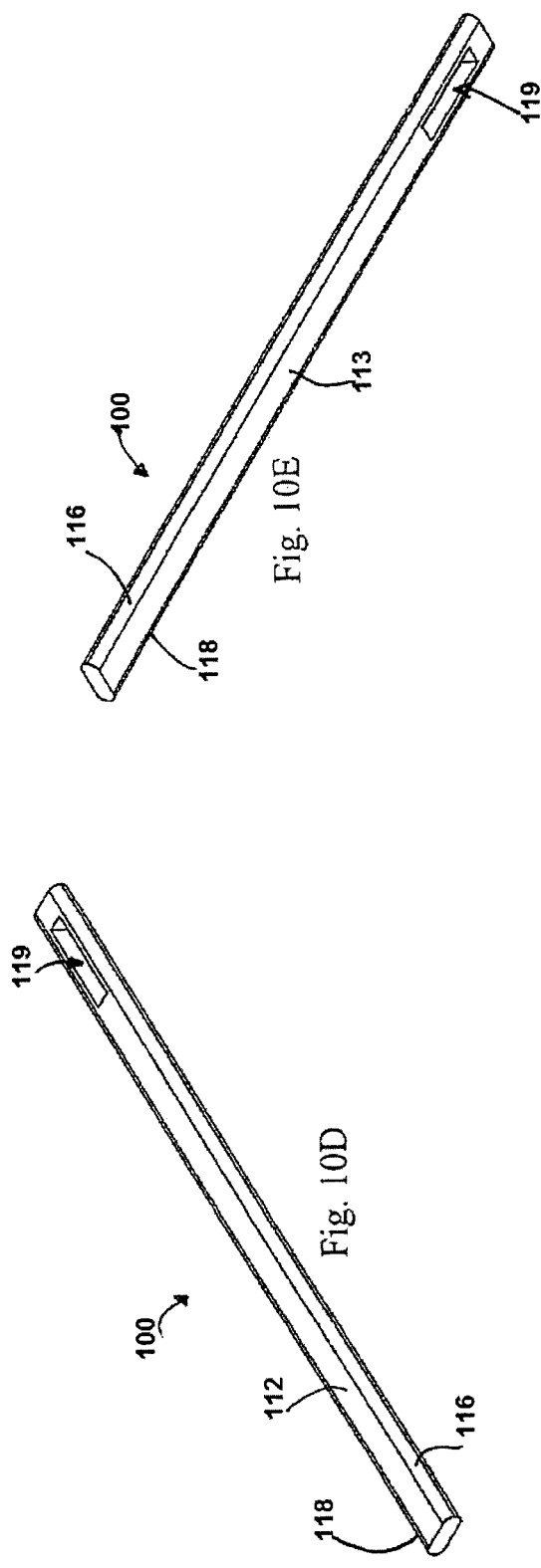

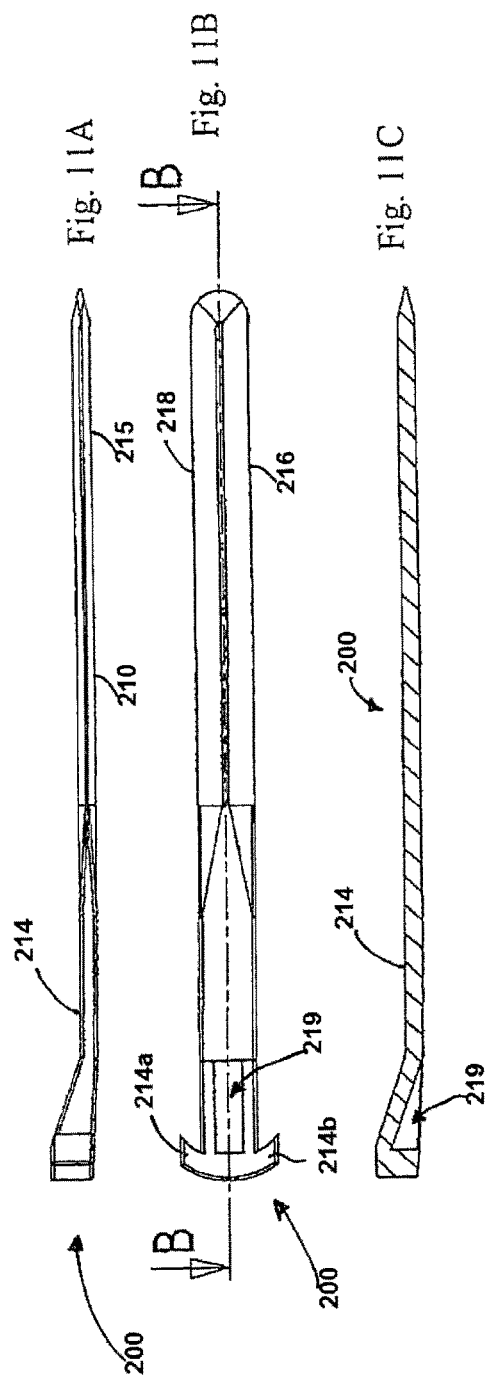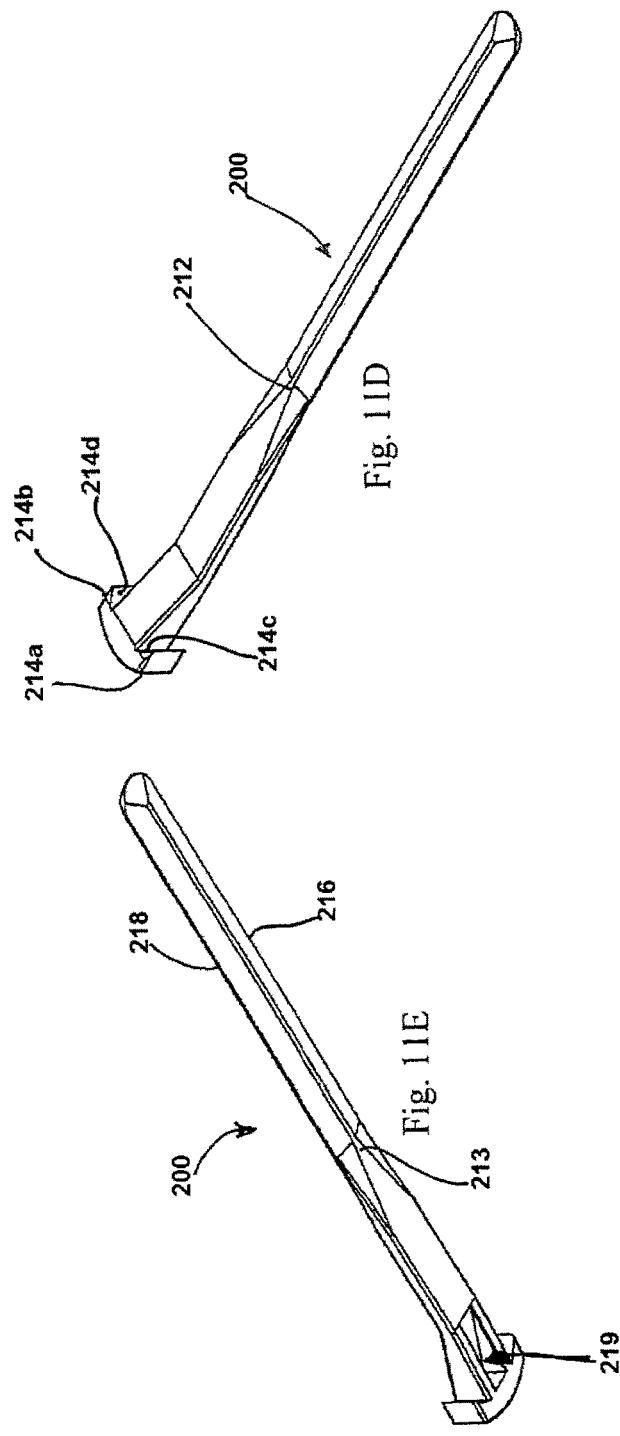

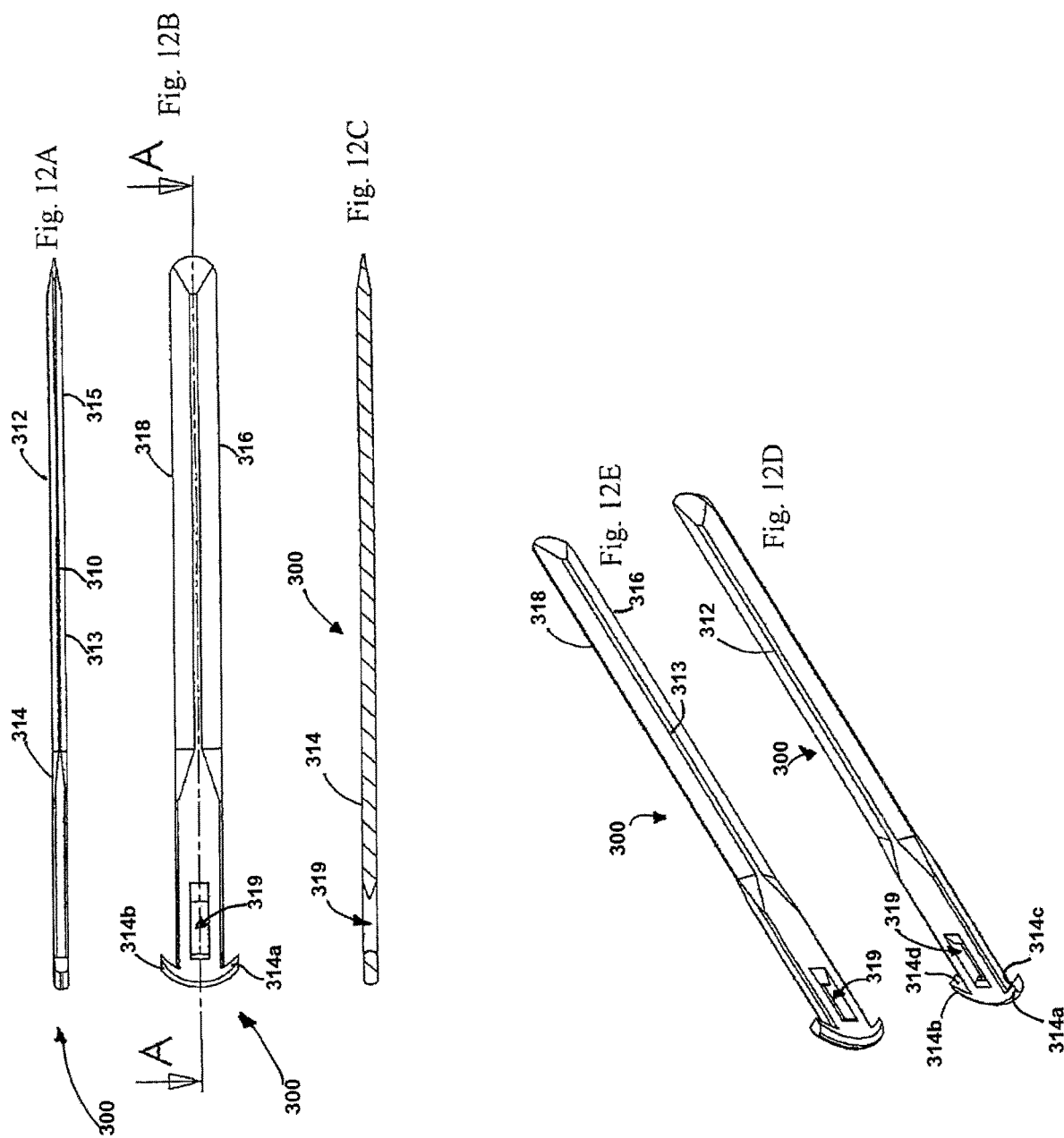

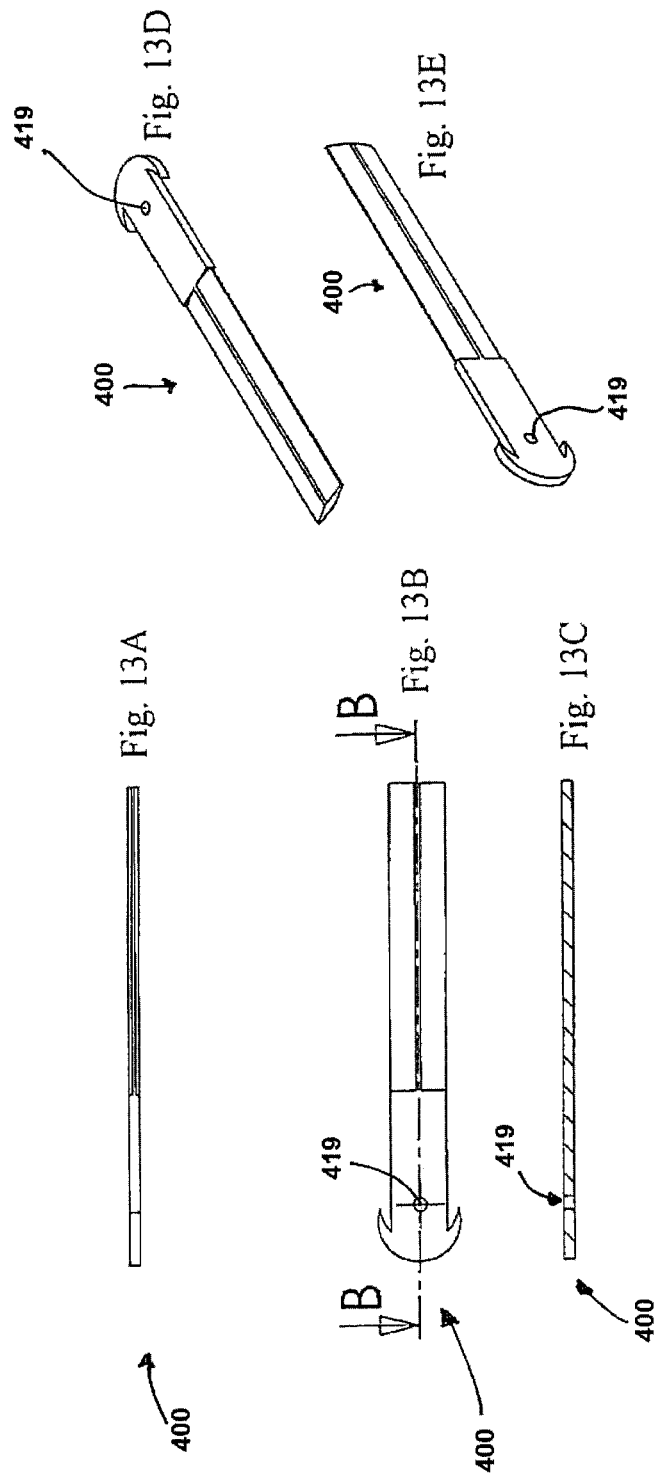

RAMPED CONNECTOR AND BLADE FOR USE WITH ROTARY HEAD ASSEMBLY

REFERENCE TO RELATED APPLICATIONS

This application is a continuation-in-part of copending and commonly-owned International Patent Application No. PCT/US2013/053801, filed on Aug. 6, 2013, which claims priority to U.S. Provisional Application No. 61/681,304, filed on Aug. 9, 2012. This application also claims the benefit of U.S. Provisional Application No. 62/041,945, filed Aug. 26, 2014. Each patent application identified above is incorporated here by reference in its entirety.

TECHNICAL FIELD

The present disclosure relates to rotary head assembly apparatuses and cutting blades designed for use with rotary head assemblies. More particularly, the present disclosure relates to rotary head assembly apparatuses configured to easily replace cutting members necessary to cut unwanted plants and cutting blades therefor.

BACKGROUND

Presently, there are trimming apparatuses known in the art having a rotatable, attachable head for attachment to a powered device, with the head carrying a series of trimmer lines extending axially out about the periphery of the head. Examples of such weed trimming apparatuses include spool and "bump 'n' feed" weed trimming apparatuses with continuous-feed trimming line, automatic-feed trimmer head, and trimming apparatuses using fixed-length pieces of trimming line or blades. However, such weed trimming apparatuses have certain drawbacks which have gone largely unaddressed in this technical field.

Both the "bump 'n' feed" and automatic trimmer head relies on an internal spool with trimmer line reserves. Stress on these apparatuses' trimming lines will cause it break from time to time during use. Because of their designs, the trimmer lines often get twisted, tangled or buried within the spool making it difficult to dispense the proper line length for cutting. As a result, the trimmer head must then be disassembled, the trimmer string unwound and again rewound in the proper manner before the trimmer head will again work as designed. This process is difficult, labor intensive and highly time consuming.

To address the aforementioned problems of the conventional "bump 'n' feed" and automatic trimmer heads, blades or fixed-length trimmer line pieces have been incorporated into the trimmer head. As the blades become dull or the trimmer lines break, often times, it require additional tools and/or a lot of time to replace the worn or broken pieces. Thus, a need exists for a rotary apparatus that does not tangle, twist, or bind cutting members such as the trimmer lines. Furthermore, a need exists for a rotary apparatus that does not have to be disassembled to have new strings or other types of cutting members added. Lastly, a need exists for a rotary apparatus which requires little time and effort to replace the cutting members such as trimmer lines or cutting blades. These needs are met by the present invention as described and claimed below.

SUMMARY OF THE INVENTION

From the foregoing, it is apparent there is still a great and long-felt need for a rotary apparatus, in particular a rotary head assembly, that provides quick and easy insertion of a cutting member in order to resume operation as well as simple and efficient removal of the cutting member when replacing it. The present invention addresses the foregoing need, amongst other needs, in a highly unique and facile way. Thus, in one aspect, the present invention provides a novel rotary apparatus, particularly a rotary head assembly from which a cutting member may extend. Particularly, in at least one of its aspects, this invention provides quick and easy insertion of a cutting member in order to resume operation of the rotary apparatus. In another aspect, the invention also facilitates removal of a cutting member during change out, so that there is no need to disassemble the rotary head assembly of the rotary apparatus, as required in other known trimmer apparatuses. The cutting member of the present invention can be flexible (e.g. wires, strands, etc.), semi-rigid (e.g. plastic blades), or rigid (e.g. metal blades) and may be made of any material and in any shape capable of cutting unwanted plants such as weeds. Non-limiting examples of cutting member materials include plastics (e.g. nylon), metals, metal alloys, and combinations thereof.

In one aspect, this invention provides a rotary apparatus comprising a rotary head assembly configured for attachment to a rotary power source, wherein the rotary head assembly has at least one cutting member receptacle wherein said cutting member receptacle optionally rotates or is fixed onto the rotary head assembly, defines at least one cutter inlet and at least one cutter outlet, wherein the cutter inlet is positioned opposite the cutter outlet and sized and configured to receive at least one cutting member and comprises a cutting member retainer wherein the cutting member retainer is positioned in between the cutter inlet and the cutter outlet comprising a channel extending from the cutter inlet forming a ramp surface which is optionally declining or inclining relative to the cutter inlet, so that the cutting member may be inserted into the cutter inlet and engaged with the cutting member retainer and retained by the cutting member receptacle until it is threaded through the cutter outlet.

In another aspect, this invention provides cutting blades sized and configured for easy installation and efficient and effective performance with particular types of trimmer rotary head assemblies. One particular aspect of the invention provides a cutting blade for use with a rotary trimmer head assembly configured with one or more swiveling blade retention members. The blade comprises an elongated body extending along a longitudinal axis, the body forming two opposing planar surfaces and the body comprising a trimmer head connecting end portion and a cutting end portion, the cutting end portion forming at least one cutting edge, and one or more protrusions extending from the trimmer head connecting end portion laterally relative to the longitudinal axis of the elongated body, wherein either (a) one of the planar surfaces forms, at the trimmer head connecting end portion an indentation sized to receive at least one cutting member retainer extending from a component of a trimmer head assembly, or (b) the trimmer head connecting end portion defines an aperture extending through both of the opposing planar surfaces, the aperture being sized to receive at least one cutting member retainer extending from a component of a trimmer head assembly, so that the blade is detachably coupled to and retained by a respective one of the swiveling blade retention members while the blade extends radially outwardly from the trimmer head assembly during operational rotation of the rotary trimmer head assembly. In one particular aspect of the invention, each of the one or more protrusions forms a laterally extending surface which extends out from the elongated body at the trimmer head connecting end portion, the surface being configured to contact a respective one of the swiveling blade retention members when the cutting member retainer is mated with and received by either the indention of (a) or the aperture of (b) and the blade is urged radially outwardly from the rotary head assembly, e.g., by centrifugal force. The cutting member retainer may be, e.g., in the form of a ramp having a channel-defining edge configured to catch at least a portion of the blade and prevent the blade from moving radially outwardly from the rotary head assembly by, e.g., centrifugal force, when the cutting member retainer is mated with either the indentation of (a) or the aperture of (b), as applicable.

These and other features, aspects and advantages of this invention will be still further apparent from the ensuing description, drawings, and appended claims.

BRIEF DESCRIPTION OF THE DRAWINGS

FIG. 5 are perspective views and a cross-sectional view of the cutting member receptacle.

FIG. 5a are exemplary embodiments of the cutting member retainer.

FIG. 10A is a side view of a cutting blade according to one embodiment of the invention.

FIG. 10B is a top plan view of the device of FIG. 10A.

FIG. 10C is a cross-sectional view of the device of FIG. 10A, cut along line A-A.

FIG. 10D is a view in perspective of the device of FIG. 10A, from above the device.

FIG. 10E is a view in perspective of the device of FIG. 10A, from below the device.

FIG. 11C is a cross-sectional view of the device of FIG. 11B, cut along line B-B.

FIG. 11D is a view in perspective of the device of FIG. 11A, from above the device.

FIG. 11E is a view in perspective of the device of FIG. 11A, from below the device FIG. 12C is a cross-sectional view of the device of FIG. 12B, cut along line A-A.

FIG. 12D is a view in perspective of the device of FIG. 12A, from above the device.

FIG. 12E is a view in perspective of the device of FIG. 12A, from below the device.

FIG. 13C is a cross-sectional view of the device of FIG. 13B, cut along line B-B.

FIG. 13D is a view in perspective of the device of FIG. 13A, from above the device.

FIG. 13E is a view in perspective of the device of FIG. 13A, from below the device.

In each of the above figures, like numerals are used to refer to like or functionally like parts among the several figures.

FURTHER DETAILED DESCRIPTION OF THE INVENTION

Illustrative implementations of the invention are described below as they might be employed in the construction and use of a rotary apparatus and related method according to at least one implementation of the present invention. It will be of course appreciated that in the development of such an actual implementation, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. In the detailed description below, general discussion of alternative steps, configurations, features and/or components may employ reference to numbered components identified in the accompanying figures. However, it should be appreciated that, unless otherwise explicitly noted, such alternative steps, configurations, features and/or components are not necessarily limited to the particular aspect illustrated in the relevant figures, as the use of such number references in this context is merely for the sake of clarity.

Turning now to the Figures, several illustrative aspects of the apparatus of the present invention are shown. Looking now at FIG. 1, an apparatus comprising a rotary head assembly 10 configured for attachment to a rotary power source (not shown) is shown. The rotary power source may be any source capable to provide sufficient rotation to cut unwanted plants such as weeds. Non-limiting examples of the rotary power source includes any gas-powered, electric-powered, or battery-powered motor found on any standard commercial weed trimming device, such as a "weedeater." The rotary head assembly 10 is sized and configured for attachment to such commercially known weed trimming devices through the use of an attachment member such as a clamp, bolt, or threaded screw (not shown) through the central member aperture 12 defined by the central member 14 of the rotary head assembly.

Figure 1:
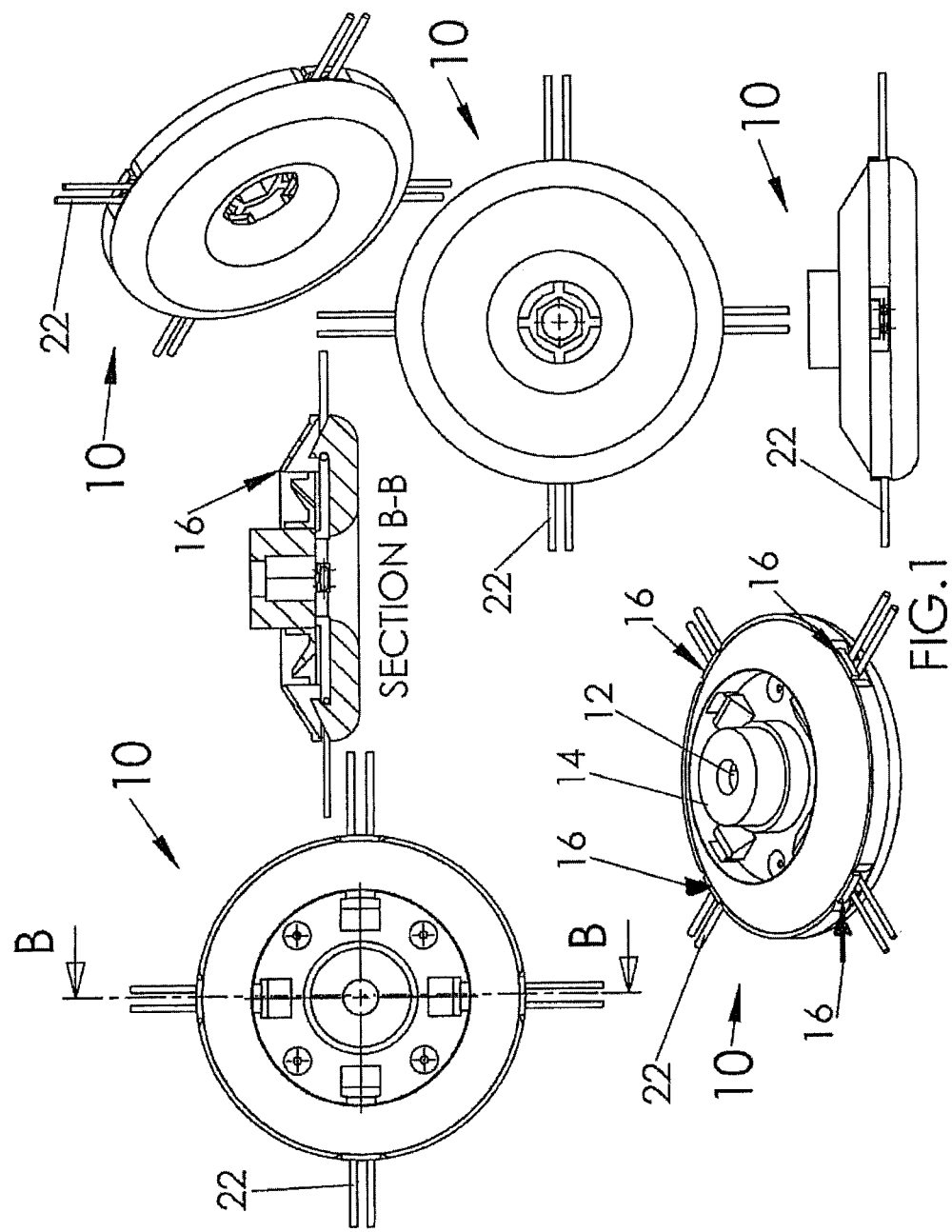
FIG. 1 are perspective views and a cross-sectional view of the rotary head assembly, the cutting member receptacle, and the cutting members consistent with one aspect of the present invention.
Figure 2:
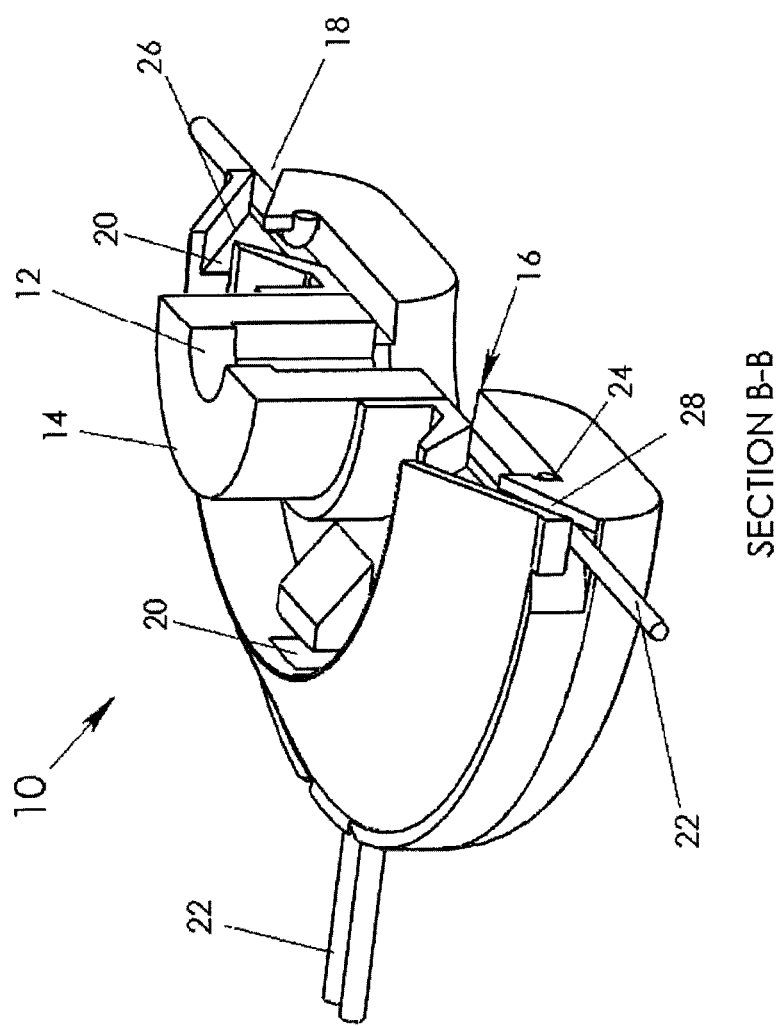
FIG. 2 is a cross-sectional view of the rotary head assembly of FIG. 1.

In one embodiment, the invention comprises the rotary head assembly 10, as illustrated in FIGS. 1 and 2, wherein the rotary head assembly has at least one cutting member receptacle 16 wherein said cutting member receptacle is fixed onto the rotary head assembly 10, defines at least one cutter inlet 18 and at least one cutter outlet 20, wherein the cutter inlet is positioned opposite the cutter outlet and sized and configured to receive at least one cutting member 22 and comprises a cutting member retainer 24 wherein the cutting member retainer is positioned in between the cutter inlet and the cutter outlet comprising a channel 26 extending from the cutter inlet forming a ramp surface 28 which is inclining as shown, but may be optionally configured to be declining, relative to the cutter inlet, so that the cutting member 22 may be inserted into the cutter inlet 18 and engaged with the cutting member retainer 24 and retained by the cutting member receptacle 16 until it is threaded through the cutter outlet 20.

Figure 3:
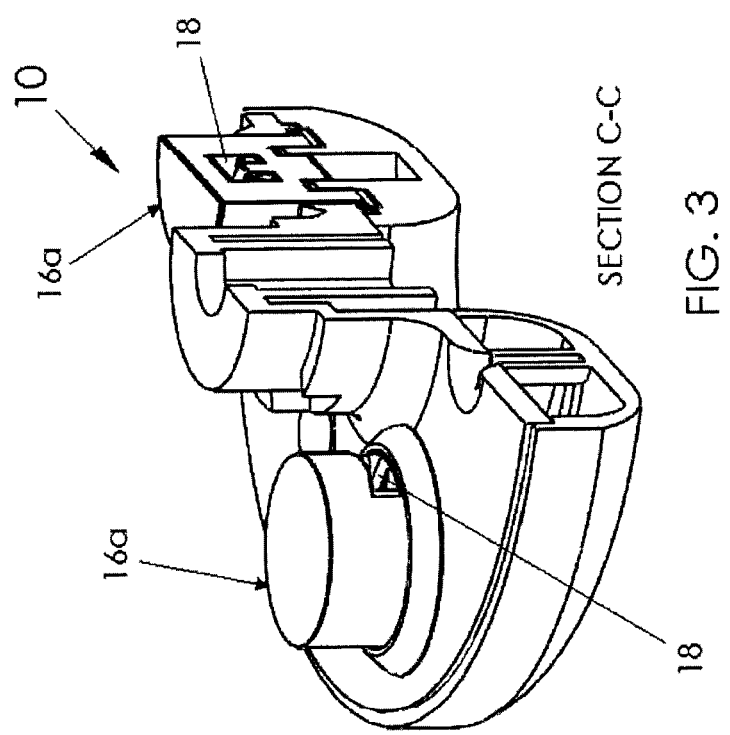
FIG. 3 is a cross-sectional view of the rotary head assembly, the cutting member receptacle consistent with one aspect of the present invention.
Figure 4:
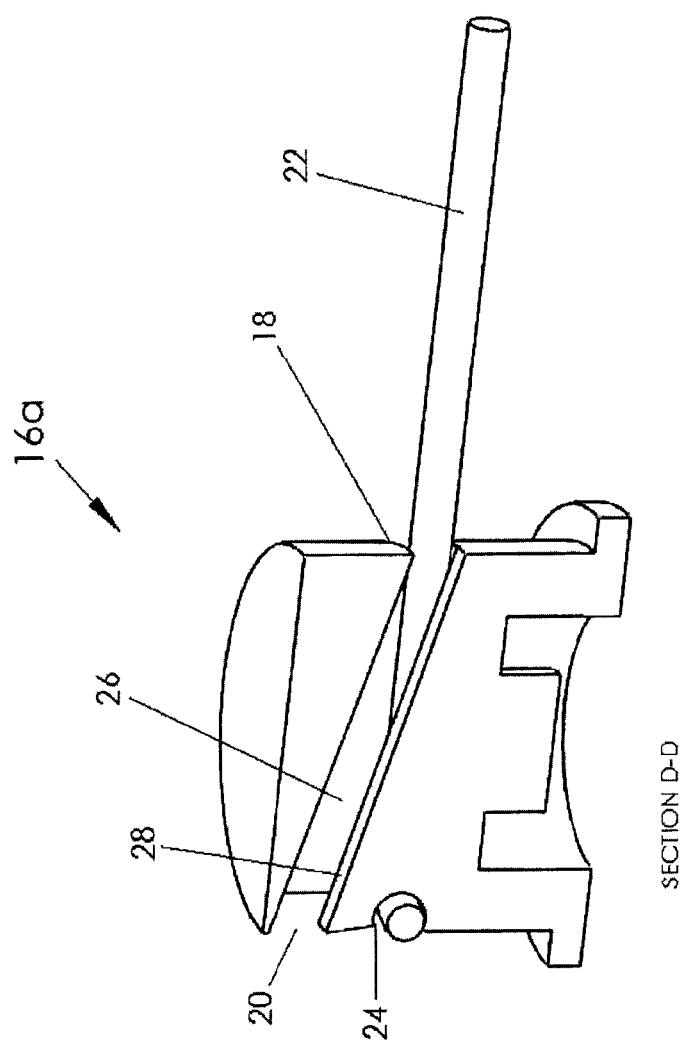
FIG. 4 is a cross-sectional view of the cutting member receptacle included within FIG. 3.

As illustrated in FIGS. 3 and 4, the invention of another embodiment comprises the rotary head assembly 10, defines at least one cutting member receptacle 16a configured to rotate in the same and opposite direction of the rotary head assembly during use, defines at least one cutter inlet 18 and at least one cutter outlet 20, wherein the cutter inlet is positioned opposite the cutter outlet and sized and configured to receive at least one cutting member 22 and comprises a cutting member retainer 24 wherein the cutting member retainer is positioned in between the cutter inlet and the cutter outlet comprising a channel 26 extending from the cutter inlet forming a ramp surface 28 which is inclining as shown, but may be optionally configured to be declining, relative to the cutter inlet, so that the cutting member 22 may be inserted into the cutter inlet 18 and engaged with the cutting member retainer 24 and retained by the cutting member receptacle 16a until it is threaded through the cutter outlet 20.

The cutting member receptacle of the present invention may be spatially arranged in any configuration on, in, or combinations thereof with the rotary head assembly. In another embodiment, the cutting member receptacle may be configured as part of the rotary head assembly or as removable attachments. In yet another embodiment, the rotary head of the present invention may be configured to receive a single cutting member receptacle or a plurality of the cutting member receptacles. In yet a further embodiment, where there are at least two cutting member receptacles, each cutting member receptacle may be spatially arranged in any configuration relative to the other, non-limiting examples include, above, below, opposite, next to, within, or combinations thereof.

As shown in FIG. 5, the cutting member receptacle 16a portion of the present invention may form various shapes and configurations. In one embodiment, one skilled in the art may shape and configure the cutting member receptacle 16a to receive different types of cutting member such as a cutting member shaped like a blade 30, wherein said cutting member of this embodiment has a cutting portion 35 and an attachment portion 40 configured to engage and be retained with the cutting member retainer 24 until the cutter member as exemplified by the blade 30 is threaded through the cutter outlet 20. The cutting member retainer 24 of the present invention may be configured in any form or shape to engage and retain the cutting member when in use. FIG. 5a illustrates various examples of the cutting member retainer embodiments 24a, 24b, 24c, and 24d. In one embodiment, the cutting member retainer 24 may be formed similar to a shape of the a portion of the cutting member's exterior and sized to receive it, non-limiting shapes include circular 24a, angular 24b and 24d, rectangular 24c, oval, combinations thereof, or any shape capable of retaining the cutting member. In another embodiment, the cutting member retainer 24 comprises a concave space below the cutter outlet 20.

Figure 6:
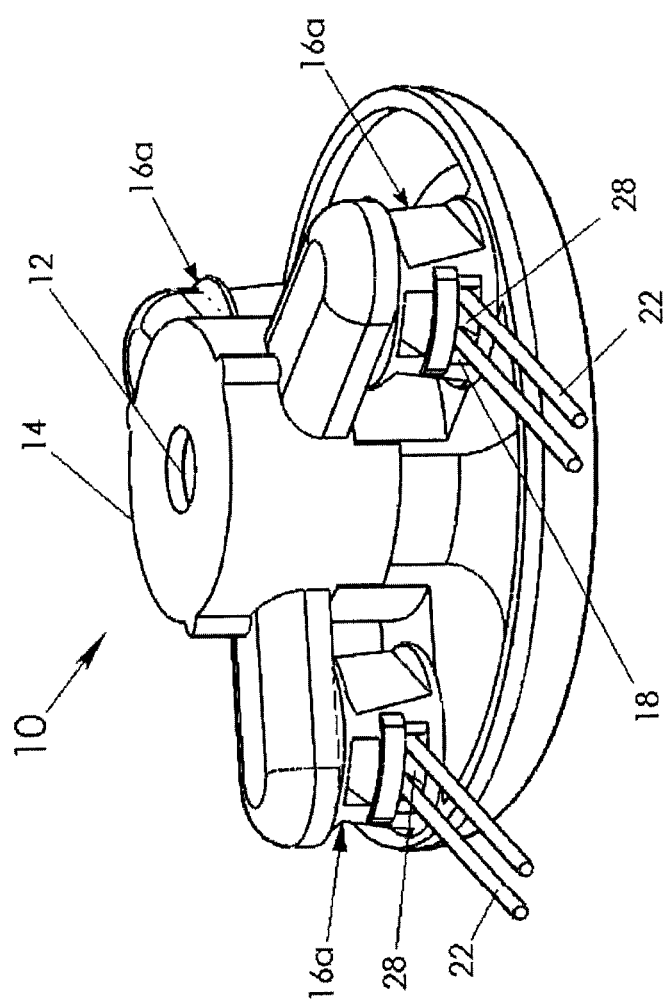
FIG. 6 is a perspective view of the rotary head assembly, the cutting member receptacle, and the cutting members consistent with one aspect of the present invention.
Figure 6A:
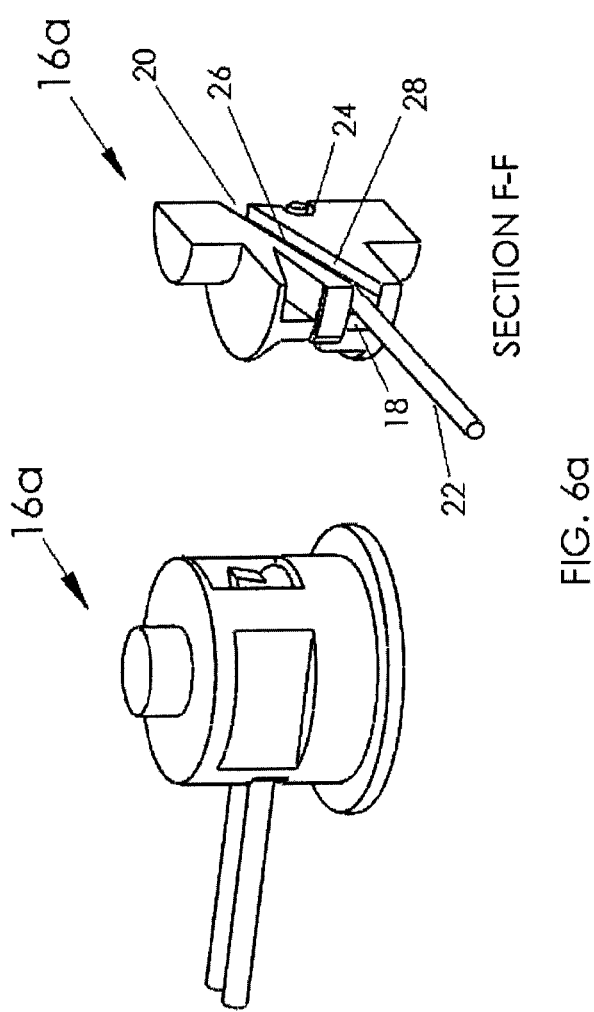
FIG. 6a are perspective views and a cross-sectional view of the cutting member receptacle included in FIG. 6.

In one embodiment as illustrated in FIGS. 6 and 6a, a cutting member receptacle 16a configured to receive cutting members 22 such as those that are commercial available such as flexible monofilament plastic trimmer lines of any suitable type and cross-sectional configuration, e.g., 0.065, 0.080, 0.095, 0.105, 0.12, 0.13 or 0.15 gauge nylon trimmer line or the like. In a further embodiment, the cutting member receptacle 16a configured to receive a cutting member, such as a trimmer line 22 as exemplified in FIG. 6a. In particular, the cutting member receptacle 16a defines at least one cutter inlet 18 and at least one cutter outlet 20, wherein the cutter inlet is positioned opposite the cutter outlet and sized and configured to receive at least one cutting member 22, and comprises a cutter member retainer 24 wherein the cutter member retainer is positioned in between the cutter inlet and the cutter outlet comprising a channel 26 extending from the cutter inlet forming a ramp surface 28 which is declining or inclining relative to the cutter inlet, so that the cutting member 22 may be inserted into the cutter inlet and engaged with the cutter member retainer and retained by the cutter member retainer until it is threaded through the cutter outlet.

Figure 7:
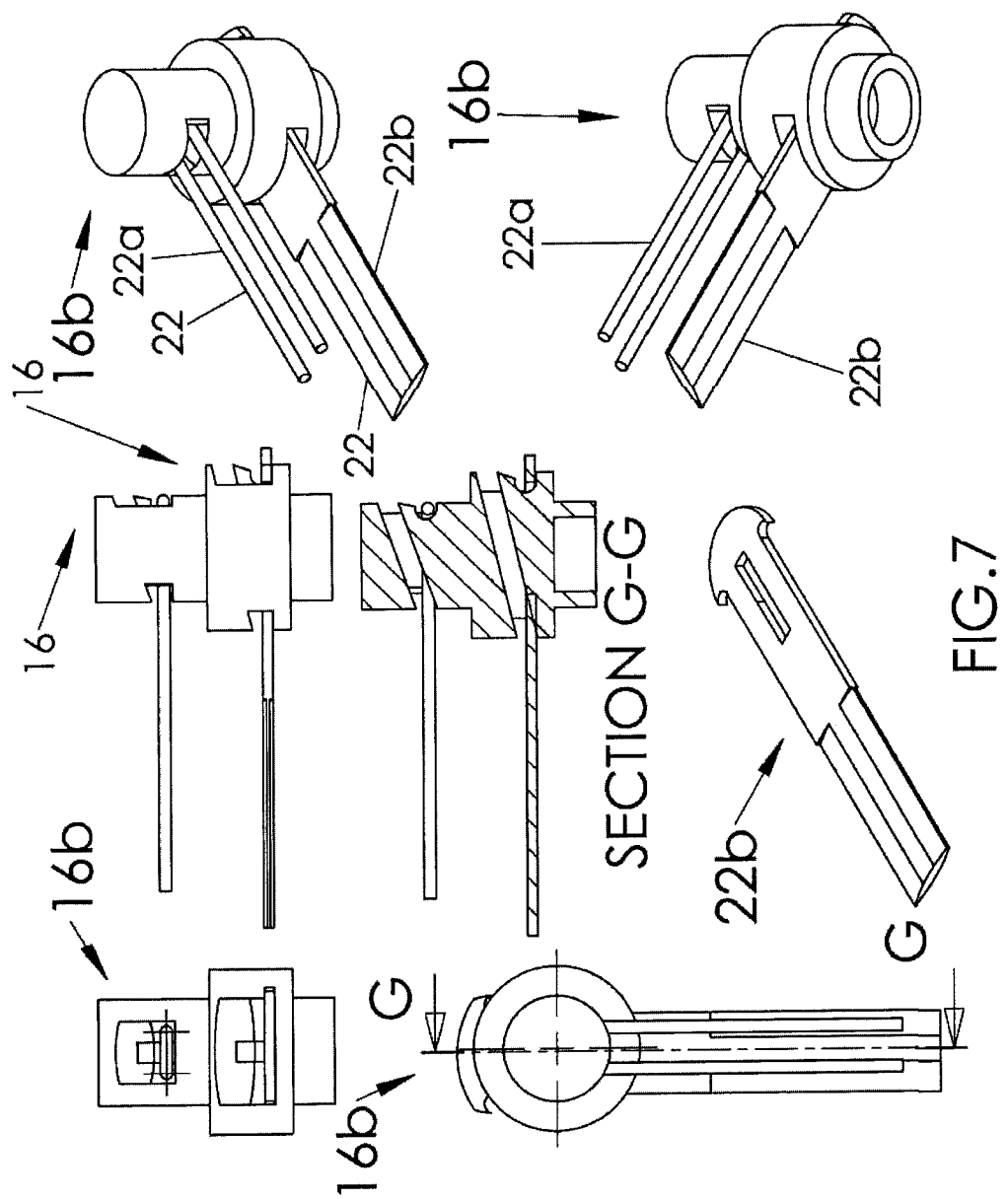
FIG. 7 is a perspective view and a cross-sectional view of the cutting member receptacle.

In another embodiment, as illustrated in FIG. 7, the cutting member receptacle 16b is configured to be on top of another cutting member receptacle. In yet a further embodiment, the rotary apparatus of the present invention may be configured with a singular cutting member or a plurality of cutting members 22, as exemplified in FIG. 7, wherein the cutting members may be the same material, same shape, same texture, different material, different shape, different texture, or combinations thereof from each other. As illustrated in FIG. 7, the cutting member receptacle comprises at least one cutting member 22a which is a flexible trimmer line and at least one cutting member which is a blade-like 22b.

Figure 8:
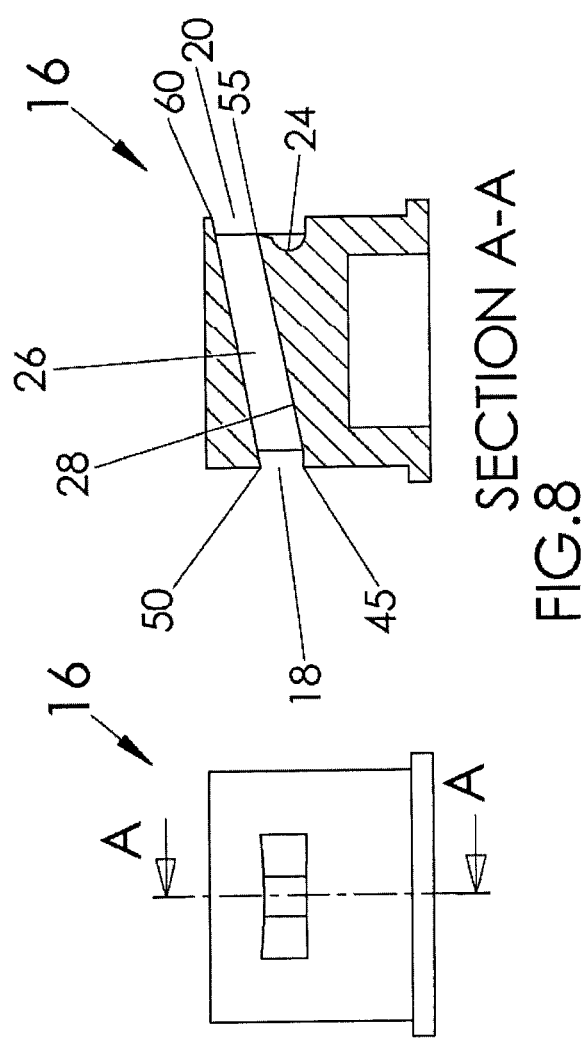
FIG. 8 is a cross-sectional view of the cutting member receptacle.
Figure 9:
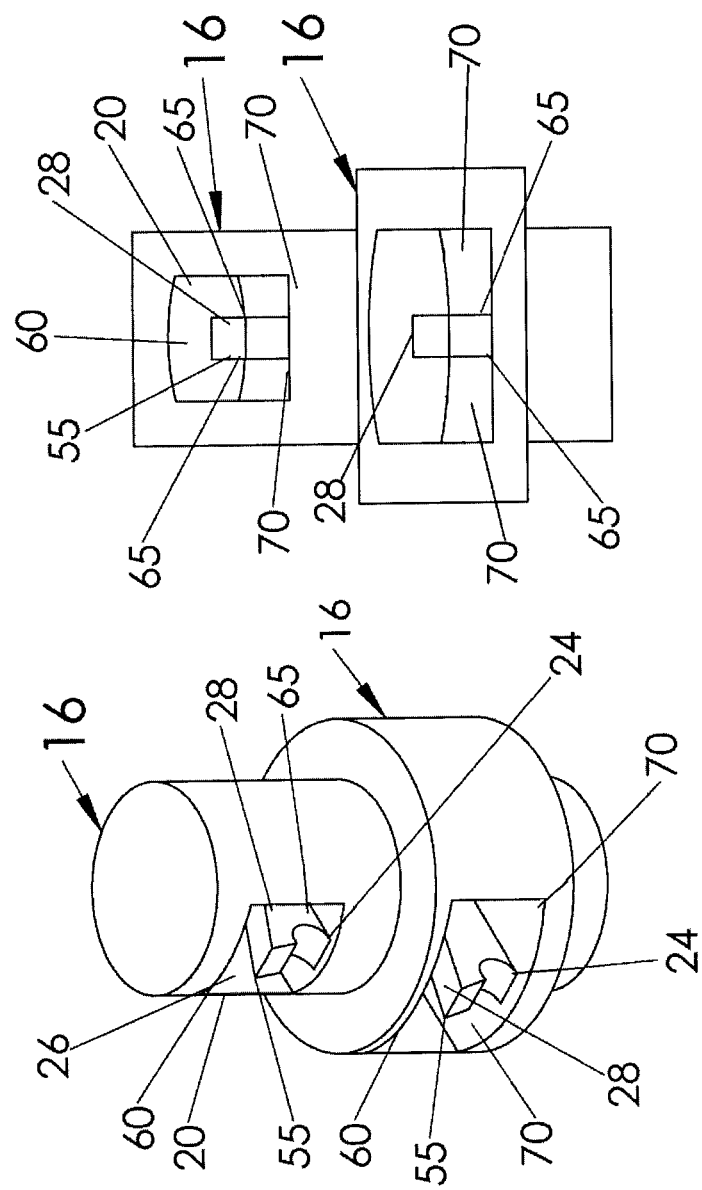
FIG. 9 are perspective views of the cutting member receptacle.

In one aspect of the invention as exemplified in FIGS. 8 and 9, the cutting member receptacle 16 comprises a channel 26 comprising of a lower channel opening 45, an upper channel opening 50, a lower channel outlet 55 and an upper channel outlet 60. The distance between the lower channel opening 45 and the upper channel opening 50 is configured to receive the cutting member of choice when inserted through the cutter inlet 18 and the distance between the lower channel outlet 55 and the upper channel outlet 60 is configured to thread the cutting member of choice through the cutter outlet 20. In another embodiment, the distance between the lower channel opening 45 and the upper channel opening 50 is configured to retain the cutting member when the rotary head is in use. In yet another embodiment, the distance between the lower channel outlet 55 and the upper channel outlet 60 is configured to retain the cutting member when the rotary head is in use. The distance between the lower channel opening 45 and the upper channel opening 50 may be the same or different as the distance between the lower channel outlet 55 and the upper channel outlet 60. In a preferred embodiment, the distance between the lower channel opening 45 and the upper channel opening 50 is the same as the distance between the lower channel outlet 55 and the upper channel outlet 60. In another preferred embodiment, the distance between the lower channel opening 45 and the upper channel opening 50 is configured relative to the distance between the lower channel outlet 55 and the upper channel outlet 60 to secure the cutting member when in use and easily removed when threaded through the cutter outlet 20.

In yet another aspect of the invention, the lower channel opening 45 and lower channel outlet 55 are configured relative to one another forming a ramp 28 for receiving a cutting member, wherein the ramp may be optionally inclining or declining relative to the cutter inlet 18. One skilled in the art may configure the ramp with respect to the embodiments of the present invention at any angle relative to the cutter inlet 18. In one embodiment on an imaginary axis, when the lower channel opening 45 is positioned lower than the lower channel outlet 55, a ramp 28 configured to incline relative to the cutter inlet 18 is formed as exemplified in FIG. 8. In another embodiment on an imaginary axis, when the lower channel opening 45 is positioned higher than the lower channel outlet 55, a ramp configured to decline relative to the cutter inlet 18 is formed. In one embodiment on an imaginary axis, where the ramp is inclining relative to the cutter inlet 18, the upper channel opening 50 is configured to be level or lower than the lower channel outlet 55. In another embodiment on an imaginary axis, where the ramp is declining relative to the cutter inlet 18, the lower channel opening 45 is configured to be level or higher than the upper channel outlet 60. In a preferred embodiment on an imaginary axis, the lower channel opening 45 and the lower channel outlet 55 are positioned to secure the cutting member when in use and easily removed when threaded through the cutter outlet 20 when the rotary head is not in use.

In one embodiment (FIG. 9), a cutting member receptacle 16 configured and positioned on top of another cutting member receptacle 16. In one embodiment, the ramp surface 28 comprises at least two side edges 65. The side edges 65 are configured and sized to define at least two side channels 70 extending from the cutter inlet to the cutter outlet 20 sufficient to receive a cutting member through the cutter inlet and retain the cutting member within the cutting member retainer 24 when in use and release the cutting member when threaded through the cutter outlet 20.

In another aspect of the invention, a cutting blade is provided, the blade having a cutting end portion and an attachment end portion, the attachment end portion being sized and configured to engage with and be retained by a cutting member retainer (also referenced herein as a blade retention member) of the trimmer head assembly. Typically the retainer component is configured to retain the blade unless and until the blade is threaded through a cutter outlet or otherwise uncoupled from the trimmer head assembly by a manual actuation of the retainer component or a device coupled thereto, so that the blade may be removed through either the cutter outlet or the cutter inlet.

As noted above with reference to FIGS. 5 and 7, one aspect of the invention provides a cutting blade comprising features which work particularly well with trimmer head assemblies described herein in which a swiveling component in the form of a swiveling blade retention member which defines the cutting member retainer and swivels relative to the rest of the trimmer head. In this way, the blade may be coupled to the trimmer head and yet swivel relative to the trimmer head. One example of such a swiveling component which can be adapted to receive the blades of this aspect of the invention is commercially available and sold as a PIVOTRIM™ trimmer head assembly by Better-Heads, LLC of Pearland, Tex. The blades herein describe are particularly well-suited to a pivoting connection to the trimmer head assembly, because the pivoting action prevents damage to the blades during operative rotation of the trimmer head and blades and contact with the target material to be cut and/or surrounding objects. Thus, blades illustrated in FIGS. 5 and 7, as well as alternative configurations in FIGS. 10A-10E, 11A-11E, 12A-12E and 13A-13E, feature the aforesaid advantages. Each of these blades features an attachment end portion which defines an aperture or indentation through which a cutting member retainer component of the trimmer head assembly may be disposed to couple the blade to the trimmer head assembly and retain the blade so that it will not unintentionally separate (e.g., radially outwardly) from the trimmer head during operative rotation, e.g., due to centrifugal forces applicable during normal use of the associated trimmer. Some of these blades provide additional structural features which further protect against unintended disconnection of the blade from the trimmer head assembly during normal rotational operation.

Turning to FIGS. 10A-10E, different views of a cutting blade in accordance with one aspect of this invention are illustrated. The blade 100 comprises an elongated body 110 forming two opposing surfaces 112 and 113 and comprising a trimmer head connecting end portion 114 and a cutting end portion 115. The blade forms two opposing blunt cutting edges 116 and 118, and body 110 defines an elongated, rectangular aperture 119 extending therethrough. A cutter retention member, such as, member 24 of FIG. 8, may extend into aperture 119 when blade 100 is disposed over and around retention member 24 and coupled thereby to the trimmer head assembly. Preferably, blade 100 and retention member 24 when mated to one another swivel relative to the trimmer head assembly, as noted previously.

FIGS. 11A-11E illustrate another blade in accordance with an alternative aspect of the invention. A blade 200 comprises an elongated body 210 forming two opposing surfaces 212 and 213 and comprising a trimmer head connecting end portion 214 and a cutting end portion 215. The blade forms two opposed cutting edges 216 and 218, and body 210 forms and defines an elongated, rectangular indentation 219. Indentation 219 is sized to receive at least one cutting member retainer extending from a component of a trimmer head assembly. Blade 200 further comprises two opposed protrusions 214a and 214b extending from trimmer head connecting end portion 214 laterally relative to the longitudinal axis of elongated body 210. In this way, the blade is detachably coupled to and retained by a respective one of the swiveling blade retention members while the blade extends radially outwardly from the trimmer head assembly during operational rotation of the rotary trimmer head assembly. Each of the protrusions 214a and 214b forms a laterally extending arcuate surface 214c and 214d, respectively, each of which extends out from elongated body 210 at trimmer head connecting end portion 214. These surfaces are configured to contact a swiveling blade retention member when the cutting member retainer is mated with and received by the indentation and the blade is urged radially outwardly from the rotary head assembly, e.g., by centrifugal force. As noted before, the cutting member retainer may be, e.g., in the form of a ramp having a channel-defining edge configured to catch at least a portion of the blade and prevent the blade from moving radially outwardly from the rotary head assembly by, e.g., centrifugal force, when the cutting member retainer is mated with indentation 219.

As seen in FIGS. 12A-12E, an alternative aspect of the invention provides a cutting blade 300 comprising an elongated body 310 forming two opposing surfaces 312 and 313 and further comprising a trimmer head connecting end portion 314 and a cutting end portion 315. The blade forms two opposed cutting edges 316 and 318, and body 310 forms and defines an elongated, rectangular aperture 319. Aperture 319 is sized to receive at least one cutting member retainer extending from a component of a trimmer head assembly. Blade 300 further comprises two opposed protrusions 314a and 314b extending from trimmer head connecting end portion 314 laterally relative to the longitudinal axis of elongated body 310. In this way, blade 300 is detachably coupled to and retained by a respective one of the swiveling blade retention members while the blade extends radially outwardly from the trimmer head assembly during operational rotation of the rotary trimmer head assembly. Each of the protrusions 314a and 314b forms a laterally extending arcuate surface 314c and 314d, respectively, each of which extends out from elongated body 310 at trimmer head connecting end portion 314. These surfaces are configured to contact a swiveling blade retention member when the cutting member retainer is mated with and received by the indentation and the blade is urged radially outwardly from the rotary head assembly, e.g., by centrifugal force. As noted before, the cutting member retainer may be, e.g., in the form of a ramp having a channel-defining edge configured to catch at least a portion of the blade and prevent the blade from moving radially outwardly from the rotary head assembly by, e.g., centrifugal force, when the cutting member retainer is mated with aperture 319.

FIGS. 13A-13E illustrate another aspect of the invention which is a blade 400 similar to that of FIGS. 12A-12E, except that it defines an aperture 419 which is smaller and of a different shape from that which is shown in FIGS. 12A-12E, to illustrate one or several alterative configurations which could perform the same function and can be envisioned by one of ordinary skill in the art having the benefit of the rest of this disclosure. Altering the size of the aperture can, in some designs, provide additional strength to the connecting end portion of the blade material, to prevent it from breaking during blade (e.g., cutting end portion) contact with vegetation or surround objects during rotational operation of the trimmer head assembly to which each blade is coupled, in some aspects of the invention preferably so as to swivel relative thereto. In this configuration, the blade retention member may not necessarily be in the form of a ramp, but instead may be a pin or other device extending from a component of the trimmer head assembly so as to engage with aperture 419 to retain the blade in coupled engagement with the trimmer head assembly during normal rotational operation.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation within the spirit and scope of the appended claims.

What is claimed is:

1. An apparatus comprising a rotary head assembly, wherein the rotary head assembly comprises at least one cutting member receptacle wherein said cutting member receptacle:
   (i) rotates relative to the rotary head assembly;
   (ii) defines at least one cutter inlet, at least one cutter outlet, and at least one channel extending from the cutter inlet to the cutter outlet, wherein the cutter inlet is positioned opposite the cutter outlet and is sized and configured to receive at least one cutting member; and
   (iii) comprises a cutting member retainer, wherein the cutting member retainer is positioned in between the cutter inlet and the cutter outlet, said cutting member retainer having a channel-defining edge configured to catch at least a portion of the at least one cutting member when within the at least one channel so that the cutting member can be inserted into the cutter inlet and engaged with the cutting member retainer and retained by the cutting member receptacle until it is threaded through the cutter outlet.

2. The apparatus of claim 1, wherein the at least one cutting member rotates in the same and opposite direction of the rotary head assembly during use.

3. The apparatus of claim 1, wherein the at least one cutting member is fixed to the cutting member receptacle of the rotary head assembly during use.

4. The apparatus of claim 1, wherein the cutting member is selected from the group consisting of a flexible, semi-rigid, and rigid material.

5. The apparatus of claim 1, wherein the at least one channel is defined at least in part by a lower channel opening and an upper channel opening, a lower channel outlet, and an upper channel outlet.

6. The apparatus of claim 5, wherein the distance between the lower channel opening and the upper channel opening is configured to receive the cutting member through the cutter inlet.

7. The apparatus of claim 5, wherein the distance between the lower channel outlet and the upper channel outlet is configured to thread the cutting member through the cutter outlet.

8. The apparatus of claim 5, wherein the distance between the lower channel opening and the upper channel opening is configured to be optionally the same as or different from the distance between the lower channel outlet and the upper channel outlet.

9. The apparatus of claim 5, wherein the distance between the lower channel opening and the upper channel opening is configured the same as the distance between the lower channel outlet and the upper channel outlet to retain the cutting member when in use and to easily remove the cutting member when threaded through the cutter outlet.

10. The apparatus of claim 5, wherein the lower channel opening and the lower channel outlet are configured relative to each other to form a ramp surface for receiving and securing the cutting member.

11. The apparatus of claim 1, wherein the cutting member retainer is in the form of a ramp having a ramp surface, wherein the ramp surface is inclining relative to the point of entry of the cutting member into the cutting member receptacle.

12. The apparatus of claim 1, wherein the cutting member retainer is in the form of a ramp having a ramp surface, wherein the ramp surface is declining relative to the point of entry of the cutting member into the cutting member receptacle.

13. The apparatus of claim 11 or 12, wherein the ramp surface comprises at least two side edges configured and sized to define at least two side channels extending from the cutter inlet to the cutter outlet to receive the at least one cutting member through the cutter inlet and retain the cutting member within the cutting member retainer when in use and release the cutting member when threaded through the cutter outlet.

14. The apparatus of claim 1, wherein the cutting member retainer is in the form of a ramp having a ramp surface, wherein said ramp surface is either inclining or declining relative to a point of entry of the at least one cutting member into the cutting member receptacle so that the at least one cutting member can be inserted into the cutting member receptacle and engaged with the cutting member retainer and retained by the cutting member receptacle until the at least one cutting member is threaded through the cutting member receptacle.

15. The apparatus of claim 1, wherein the cutting member retainer comprises a concave space at the channel-defining edge below the cutter outlet.

16. The apparatus of claim 1, wherein the cutting member is a trimmer line.

17. The apparatus of claim 1, wherein the cutting member is a blade.

\* \* \* \* \*